United States Patent
Layzell

(10) Patent No.: US 7,634,723 B2
(45) Date of Patent: Dec. 15, 2009

(54) CONSTRAINED DOCUMENT LAYOUT

(75) Inventor: Paul Layzell, Lydney (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 197 days.

(21) Appl. No.: 10/569,845

(22) PCT Filed: Aug. 27, 2004

(86) PCT No.: PCT/GB2004/003692

§ 371 (c)(1),
(2), (4) Date: Dec. 11, 2006

(87) PCT Pub. No.: WO2005/022400

PCT Pub. Date: Mar. 10, 2005

(65) Prior Publication Data

US 2007/0118797 A1     May 24, 2007

(30) Foreign Application Priority Data

Aug. 29, 2003   (GB) ................. 0320278.5

(51) Int. Cl.
*G06F 17/00* (2006.01)
(52) U.S. Cl. .................. 715/243; 715/251; 703/1
(58) Field of Classification Search ........ 715/243, 715/244–247, 225, 212; 700/171; 345/660
See application file for complete search history.

(56) References Cited

U.S. PATENT DOCUMENTS

| | | | |
|---|---|---|---|
| 5,319,748 A | 6/1994 | Motoyama | |
| 5,363,313 A | 11/1994 | Lee | |
| 6,366,918 B1 | 4/2002 | Guttman et al. | |
| 2003/0056179 A1 | 3/2003 | Mori | |
| 2003/0110102 A1 | 6/2003 | Chien et al. | |
| 2008/0094420 A1* | 4/2008 | Geigel et al. ........ | 345/660 |

FOREIGN PATENT DOCUMENTS

| | | |
|---|---|---|
| GB | 2 245 400 A | 1/1992 |
| GB | 2 392 595 A | 3/2004 |
| WO | 90/03618 A1 | 4/1990 |
| WO | 98/10356 A1 | 3/1998 |
| WO | 03/083704 A1 | 10/2003 |

OTHER PUBLICATIONS

D. F. Wong "A New Algorithm for Floor plan Design" Published by IEEE—1988 pp. 101-107.*

Geigel et al; "Automatic Page Layout Using Genetic Algorithms for Electronic Albuming"; Proceedings of the International Society for Optical Engineering, 'Online! No. 4311, 2002, pp. 79-90, XP002346380.

(Continued)

*Primary Examiner*—Doug Hutton
*Assistant Examiner*—Quoc A Tran

(57) ABSTRACT

A description of document elements to be laid out on a page, include two or more hierarchical levels. Each document element is placed at one of the hierarchical levels. Elements at a lower hierarchical level are associated with a document element at a next higher hierarchical level. Page layout according to such a document description may be optimised discretely at different hierarchical levels without affecting constraints.

21 Claims, 13 Drawing Sheets

OTHER PUBLICATIONS

Lok et al; "A Survey of Automated Layout Techniques for Information Presentations"; IST International Symposium on Smart Graphics, 'Online! 2001, XP002346382.

Wong et al; "A New Algorithm for Floorplan Design"; 23$^{rd}$ ACM/IEEE Design Automation Conference, 1986, pp. 101-107, XP002346381.

Cohoon et al; "Distributed Genetic Algorithms for the Floorplan Design Problem"; IEEE Transactions on Computer-Aided Design, vol. 10, No. 4, Apr. 19991, pp. 483-492, XP002346383.

Schnecke et al; "Hybrid Genetic Algorithms for Constrained Placement Problems"; IEEE Transactions on Evolutionary Computation, vol. 1, No. 4, Nov. 1997, pp. 266-277, XP002346384.

Cahoon, J.P. et al.: "Floorplan design Using Distributed Genetic Algorithms", IEEE 1988, pp. 452-455.

Purvis, Lisa, "A Genetic Algorithm Approach to Automated Custom Document Assembly" Second Intl Workshop on Intelligent System Design and Applications, Aug. 7-8, 2002, p. 1-6.

Geigel, Joe, et al., "Automatic Page Layout Using Genetic Algorithms for Electronic Albuming", Proceedings of Electronic Imaging 2001, Jan. 21-26, 2001 pp. 1-12.

* cited by examiner

CONSTRAINED DOCUMENT LAYOUT

RELATED APPLICATIONS

The present application is based on International Application No. PCT/GB2004/003692 filed Aug. 27, 2004, and claims priority from, British Application Number 0320278.5 filed Aug. 29, 2003, the disclosure of which is hereby incorporated by reference herein in its entirety.

FIELD OF THE INVENTION

This invention is generally relevant to constrained document layout. It is relevant to the layout, particularly the automatic layout, of documents and document pages, and to the description of pages for document layout and the construction of such descriptions.

DESCRIPTION OF PRIOR ART

Automatic document layout is currently generally performed by imposing tight constraints on the document layout style—for example, a template is employed with a number of slots, or a table is used, and the template or table are simply populated with print primitives. This constrains the topology so tightly that only a few solutions are possible and probabilistic iteration methods are not required. However, the results are repetitive and inflexible.

Where there are no constraints, automatic document layout is often tackled using probabilistic, iterative methods. Such methods rely on encoding the document primitives' topology such that it can be manipulated stochastically. Where topological constraints need to be imposed to produce an effective document (for example, that related items be placed geographically close together, these methods are less effective.

"A Survey of Automated Layout Techniques for Information Presentations", S. Lok and S. Feiner, 1$^{st}$ International Symposium on Smart Graphics, 2001, provides a discussion of constraint issues in automated layout and outlines the prior art in this area.

SUMMARY OF THE INVENTION

Accordingly, in a first aspect the invention provides a method of laying out a page which is to contain a plurality of discrete document elements, comprising: receiving a hierarchical page description describing layout of the discrete document elements on the page, wherein the hierarchical page description contains two or more hierarchical levels, each of the discrete document elements is placed at one of the hierarchical levels; optimising layout of the page described by the hierarchical page description by one or more rearrangement operations, where each rearrangement operation rearranges elements at a single hierarchical level, to minimise the value of a cost function; and laying out the discrete document elements on the page according to the optimised hierarchical page description layout.

In a second aspect, the invention provides a description of document elements to be laid out on a page, comprising: two or more hierarchical levels; wherein each document element is placed at one of the hierarchical levels; and elements at a lower hierarchical level are associated with a document element at a next higher hierarchical level.

In a third aspect, the invention provides a method of generating a description of document elements to be laid out on a page, comprising: identifying primitive document elements to be laid out on the page; identifying constraints on the layout of the primitive document elements on the page; constructing a hierarchical page description with a plurality of hierarchical levels, each primitive document element being placed at one of the hierarchical levels, and each document element at a lower hierarchical level being linked by one of the constraints to a document element at a next higher hierarchical level.

BRIEF DESCRIPTION OF THE DRAWINGS

Specific embodiments of the invention will be described below, by way of example, with reference to the accompanying drawings, in which.

DETAILED DESCRIPTION OF SPECIFIC EMBODIMENTS OF THE INVENTION

A method of providing a customised document for which pages of the document can be laid out according to embodiments of the invention will now be described. The provision of such a customised document is discussed before specific embodiments of the invention are discussed, as it provides a particularly relevant context for use of embodiments of the invention.

Figure 6:
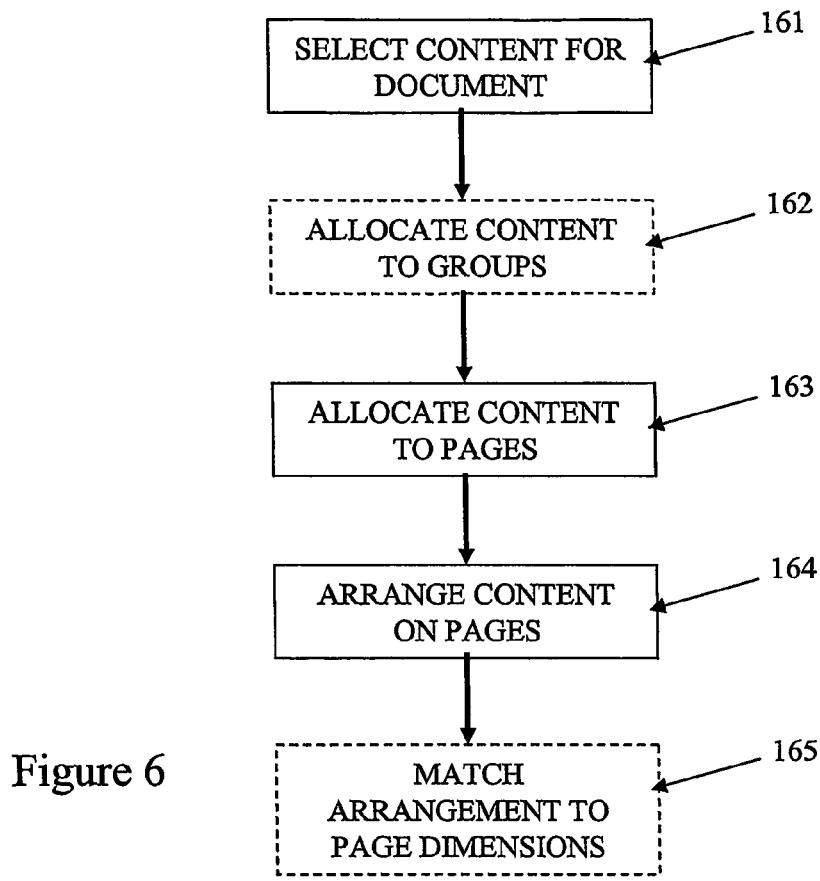
FIG. 6 represents steps involved in a process of producing a customised document to which aspects of the present invention are applicable.

Basic steps of a document production process are shown in FIG. 6. The initial step 161 is to determine what content the document needs to contain. The document may be, for example, a brochure tailored to the interests of the intended recipient—in this example, we shall assume the case of a holiday brochure. For this stage of the process, any of a number of conventional approaches could be used both to determine the interests of the intended recipient and to make a selection of content items. One such conventional approach is outlined as follows. The content items are a collection of viewable or printable two-dimensional elements, all relating to holidays: these may be pictures of locations, text descriptions of holiday packages, text descriptions of flights and so on. Each is tagged with one or more descriptors indicating their relevance to a particular keyword. The significance of the keywords for the intended recipient is determined by direct polling of the recipient, by analysing past holiday choices made by the recipient, or by studying web pages viewed by the recipient or by some combination of some or all of these. The significance of the keywords to the intended recipient is combined with the relevance of the keywords to the content items to provide a selection score for each content item, and the content items above a threshold value are selected for inclusion. This is merely one exemplary approach among many, and it should be noted that essentially any approach for determining particularly relevant content items in a database (such as, for example, approaches used for selection of content by search engines operating on the World Wide Web) can be used in connection with aspects of the present invention.

For particular aspects of the invention, it is appropriate that the selected content items are divided into a number of groups 162. This again can be achieved in a number of ways: for example, a content item may be assigned to a group on its entry into the database, or may be assigned after selection to a group determined by a keyword to which it is most relevant.

Once selected, for a multiple page document it will be necessary to assign 163 selected content items to a page. This again can be achieved in a number of ways (according to a predetermined order of groups, in accordance with greatest interest scores for the intended recipient, or otherwise) and need not in all cases be an irrevocable assignment (it may be affected by subsequent inability to produce a satisfactory arrangement of content items, for example). Again, aspects of the present invention can be employed in accordance with essentially any strategy for allocating content items to pages. The number of pages in the document may also be determined in accordance with the number, or total size, of data items to be provided (of course, selection criteria may also be tightened or relaxed so that the amount of content matches the space available).

The next step is that of primary interest in application of aspects of the present invention—the arrangement 164 of selected content items allocated to a document page on that document page. This will be discussed in much greater detail below. In different aspects of the invention, some or all of these content items may be equivalent, may be grouped, or may be ordered. There may be additional document reorganisation steps after an arrangement has been made—particularly if it has not been possible to produce a satisfactory arrangement for the or any one of the pages, in which case it may be necessary to transfer content items from page to page, or to add further pages to the document—but the only remaining step to be generally expected is matching 165 of the arrangement to the viewable region of the page. This may involve a scaling or expansion process—again, this will be described in greater detail below.

Figure 7:
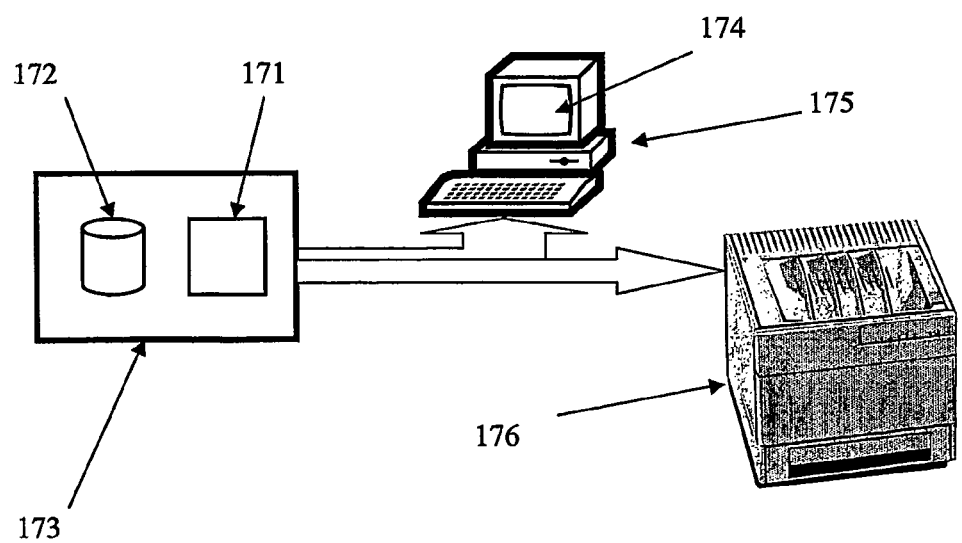
FIG. 7 shows a computing system suitable for carrying out embodiments of the invention and for consuming the results thereof.

This process can be achieved on conventional computational hardware programmed with appropriate software (provided according to aspects of the invention). An appropriate system is shown in FIG. 7. The steps of FIG. 6 may be carried out by an appropriately programmed processor 171 with access to a memory 172, for example here in server 173. The result is to be rendered on display 174 of a client computer 175, or, in cases of particular interest here, to be printed on printer 176 (which may be of essentially any type—a laser printer is shown here, though for the case of custom publishing a preferred solution may be a high performance digital printer such as the HP Indigo Press w3200).

Figure 1:
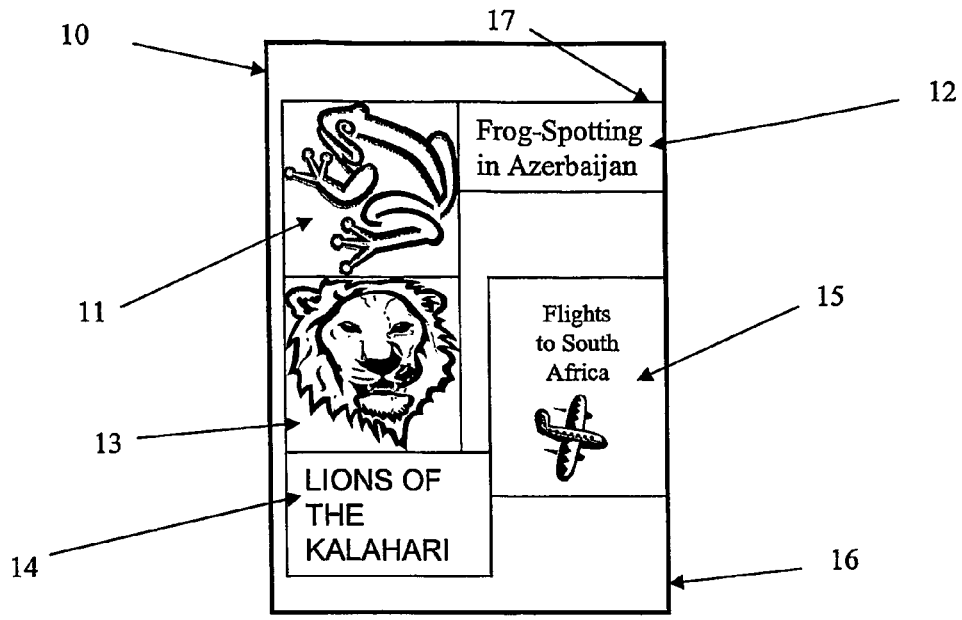
FIG. 1 shows an arrangement of objects on a page of a document.

The result for a document page may be such as that shown in FIG. 1. Two content items in a group relating to "Frogs"—picture 11 and text block 12—lie together at the top of a page 10, whereas three content items in a group relating to "Lions"—picture 13, text block 14 and mixed block 15—lie together at the bottom of the page 10. Note that the border 16 of the page 10 is a visually apparent border, whereas the border 17 of a content item is not (necessarily) a visible border, but may have significance only in the process of page composition.

Of primary interest in aspects of the invention is the arrangement of selected content items allocated to a document page on that document page. The present inventors have appreciated that it can be advantageous to consider first the constraints that are placed on the content items (hereafter "elements" or "document elements"). It can be appreciated that any piece of content (from a text block, a picture, a combination of the two, or simply a background) may be an element—the common feature of elements is that they take up space on a page (though this space may be variable or fixed). Such document elements will generally, or conveniently, be "print primitives"—basic building blocks of the document. The constraints on these elements may, for example, relate to whether particular items should be grouped together, whether an item should occupy a particular position on a page, or whether particular items should overlap.

Figure 2:
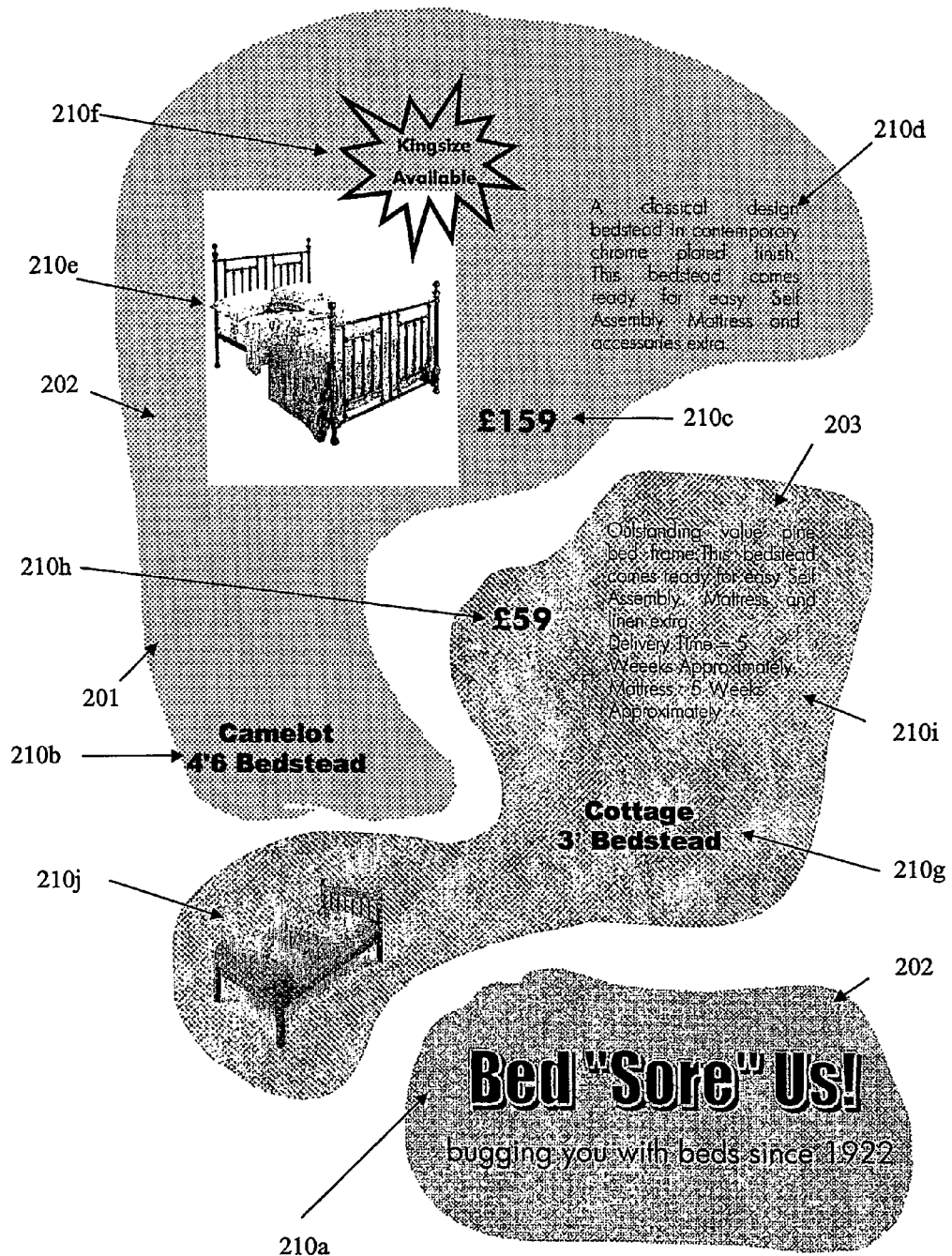
FIG. 2 shows a collection of elements to be laid out on a document page and indicates constraints to be placed on the layout.

An example of a collection of elements and associated constraints is provided in FIG. 2. This consists of a number of elements 210 (designated 210a to 210f) which all need to be placed on the page of a document—in this case, a catalogue (as indicated in the description of context above, the document layout problem is of particular interest in the composition of catalogues, particularly where catalogues are to be personalised to a user or a group of users, and is relevant particularly to printed catalogues but also potentially to on-line or other electronic catalogues). FIG. 2 identifies a number of constraints upon the final layout. Firstly, element 210a is a page heading, which should be placed at the top of the page. Secondly, there are a series of groups 201, 202, 203 identified—the elements of a group are sufficiently closely associated that they should be placed in geographical proximity to each other. These groups are of different types. Group 203 contains four items (picture 210j, price text 210h, subheading 210g and descriptive text 210i) which are to be arranged as a group. Group 201 similarly contains four items to be arranged as a group, but whereas three are simple primitive elements (price text 210c, subheading 210b and descriptive text 210d), the fourth is a composite (group 202). Group 202 contains two elements (picture 210e and emphasised descriptor 210f) which are grouped together but such that emphasised descriptor 210f overlies picture 210e). It should be noted that although discussion of implementation of specific operators on primitives does follow, both grouping and overlay, can be achieved in different ways in different embodiments of the invention, and that the way to achieve such functions is not relevant to all aspects of the invention.

The present inventor has appreciated that it is possible to address the apparently conflicting demands of constraints and of effective optimisation by constructing a hierarchical description of the elements and their associated constraints. This description is hierarchical, in that it contains a number of levels, with elements or groups of elements at each level (for simplicity, a general term of "unit" will be coined for a single element or group of elements at a hierarchical level) being laid out at the same time. For example, in the case of the FIG. 2 arrangement, the units at the highest hierarchical level are the title element 210a, group 201 and group 203, with the constraint being that these are arranged on the page with title element 210a at the top. At the next (middle, in this case) hierarchical level there are two discrete sets of units. The first set of units is that of the units in group 201: elements 210b, 210c, 210d and group 202. There is no further constraint on these units beyond that of grouping. The second set of units is that of the units in group 203: elements 210g, 210h, 210i and 210j. Again, there is no further constraint on these units beyond that of grouping. At the lowest hierarchical level there is only one set of units, the elements of group 202: picture 210e and emphasised descriptor 210f. The constraint on these units is that emphasised descriptor 210f must overlie picture 210e (again, this can be implemented in a number of ways, and while specific implementation will be discussed, implementation of this, and other, operators is not of particular significance to the present invention).

Figure 3:
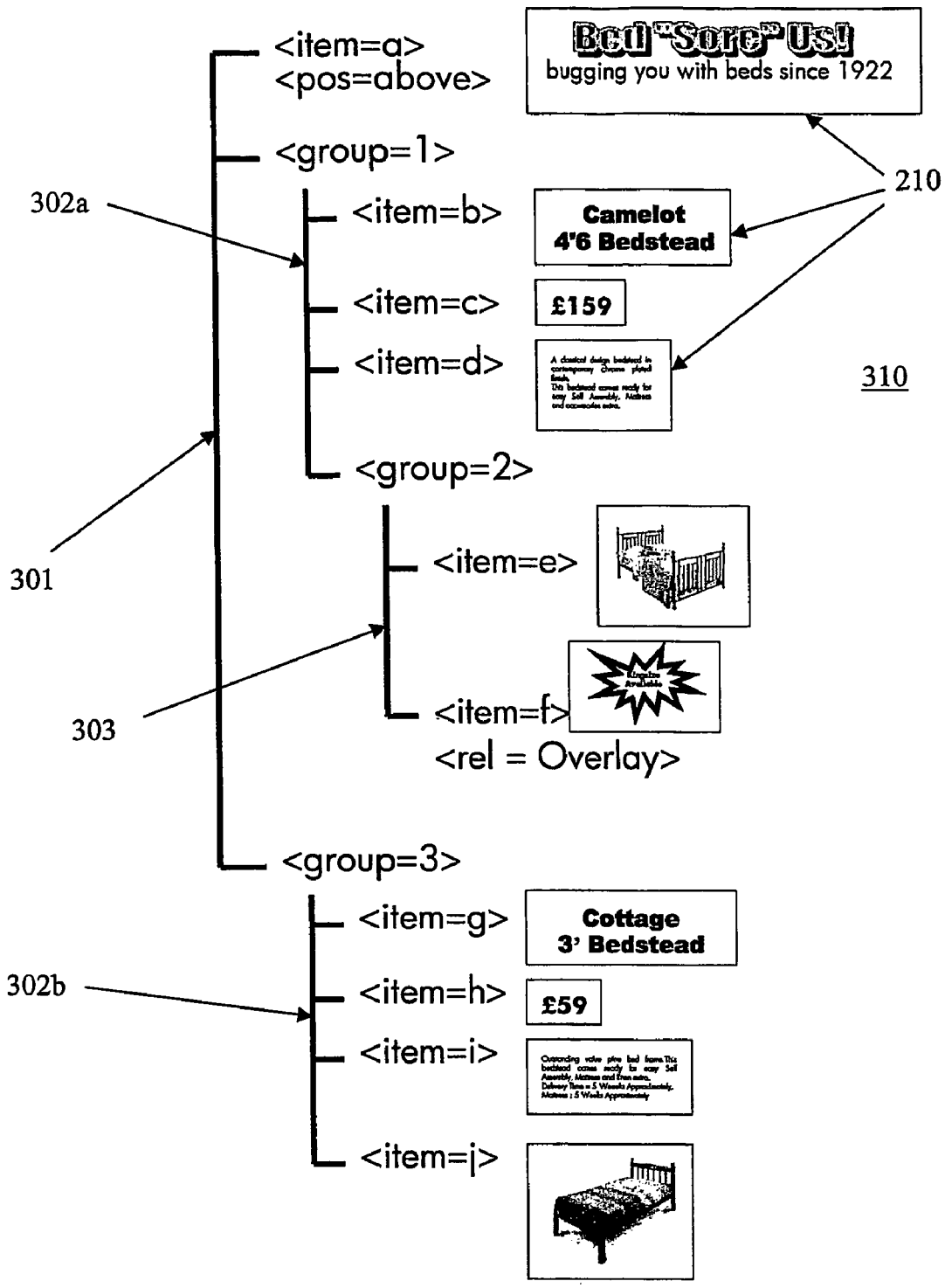
FIG. 3 shows a hierarchical representation of the collection of FIG. 2 in accordance with embodiments of the invention.

As is shown in FIG. 3, the hierarchical arrangement of items and constraints can be very effectively described as a tree structure. Highest level connecting line 301 connects the units at the top hierarchical level: element 210a (termed here as item=a, other elements being similarly identified by letter as items), group 201 (described as group=1) and group 203 (described as group=3), with the relevant organisational constraint being the positioning of element 210a at the top above all the other elements (such positioning at the top being termed pos=above—this is a property given to the node at which element 210a lies). There are two middle level connecting lines. First middle level connecting line 302a connects the units in group 201: element 210b, element 210c, element 210d and group 202 (described as group=2). There is no additional constraint on this group beyond grouping. Similarly second middle level connecting line 302b connects the units (elements 210g, 210h, 210i and 210j) in group 203 and there is again no additional constraint on these units beyond grouping. Finally, there is one lowest level connecting line 303 which connects the two units in group 202, element 210e and element 210f. There is one additional constraint on the units connected at this level—that element 210f overlies element 210e (described by labelling of the element 210f node with rel=Overlay).

Figure 4:
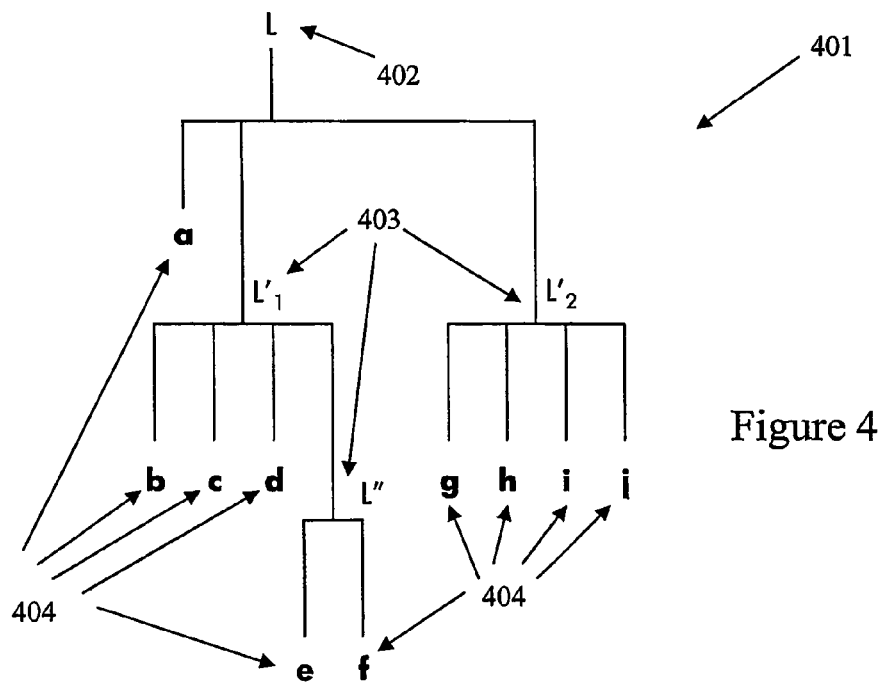
FIG. 4 shows depiction of the hierarchical representation of FIG. 3 as a tree.

The arrangement of FIG. 3 is shown in FIG. 4 as a tree 401, with each level comprising a function operating on one or more operands (units—that is, elements or groups of elements). Such a tree, with leaf nodes 404 being operands, the root node 402 being an operator acting on the branching nodes 403 and leaf nodes 404 immediately below it, and all branching nodes 403 acting as an operator on nodes immediately below and as an operand for the node immediately above, can be represented as a single function with parentheses. The function represented by FIG. 4 is the following:

$$\text{Layout}=L(a,L'_1(b,c,d,L''(e,f),L'_2(g,h,i,j)) \quad \text{Equation 1}$$

An alternative way to describe this layout is as a series of genes—this has certain advantages that will be discussed below. Equation 1, and hence the tree of FIG. 4, can be represented by the series of genes 501, 502, 503 and 504 shown in FIG. 5. It can be seen that different genes represent different hierarchical levels—in fact, every gene corresponds to a branching node (including the root node 402) of the tree 401. The significance of L in the gene structure is to indicate a particular structure, which will here be another gene (gene 501 corresponds to L, gene 502 corresponds to $L'_1$, gene 503 corresponds to $L''$, and gene 504 corresponds to $L'_2$), with the relevant operators being shown within the genes themselves. Here the operators are shown generically, with $\phi$ being used as a generic representation for any topological operator of arity 2. Each gene is laid out according to a reverse Polish notation, with two operands followed by the operator acting upon them, the result of this operation then being considered an operand for continued evaluation of the expression. The representation of the layout hierarchy in the form of genes allows for powerful techniques to be used to optimise the layout. Manipulation of the contents of each gene can be carried out (for example by stochastic techniques such as repeated application of a genetic algorithm), but as long as each manipulation only comprises rearrangement of the items within a gene with appropriate transformation of operators, then the hierarchy of constraints represented by the tree will be preserved.

An exemplary approach to optimisation will now be described—however, as will also be discussed below, other embodiments to the invention employ an approach to optimisation which differs from the specific approach indicated below (and in at least one aspect of the invention optimisation steps are outside the scope of consideration). Firstly, two basic operators will be introduced for use in describing otherwise unconstrained grouping. Secondly, it will be shown how use of these two basic operators can achieve effective layout. Thirdly, it will be shown how layouts using these two basic operators can be optimised by using a cost function and genetic algorithms. Fourthly, it will be shown how other constraining operators can be provided within this context.

Figure 8:
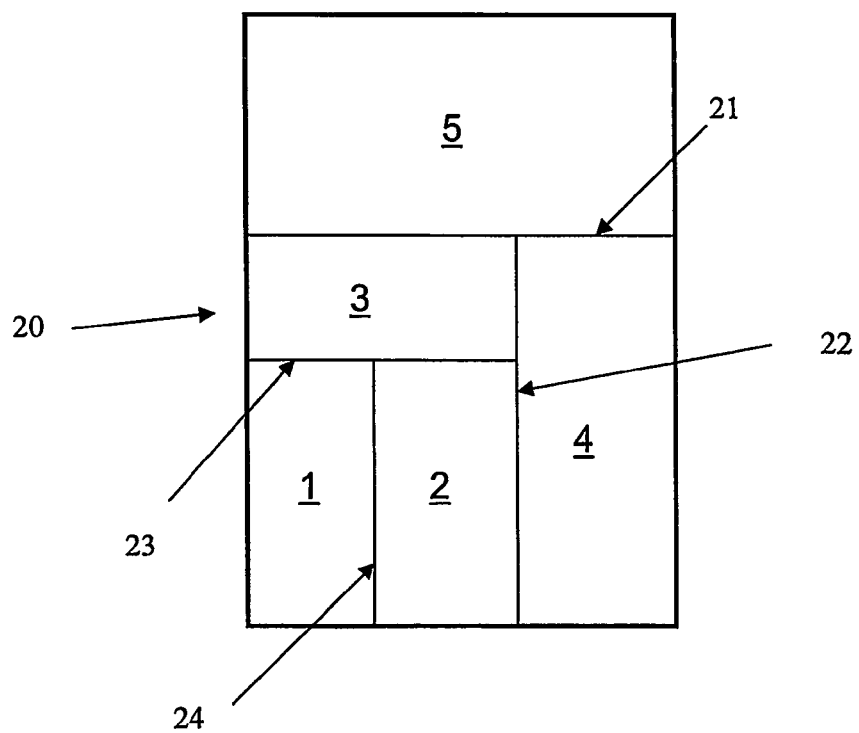
FIG. 8 shows the dissection of a rectangle into a slicing structure as employed in embodiments of the invention relating to optimisation of page layout.

Firstly, two basic operators are introduced—these are *, where AB* indicates that unit A is to the left of unit B (the two share a vertical boundary), and +, where AB+ indicates that unit A is below unit B (the two share a horizontal boundary). If content items are represented as rectangular objects with the same axes as for the page, considerable computational advantages can now be gained while still achieving very effective results in layout optimisation. In particular, it becomes possible to use the mathematics of rectangle dissection—rectangle dissection can be defined as subdivision of a given rectangle by horizontal and vertical line segments into a finite number of non-overlapping rectangles. Cutting a rectangle can be defined as dividing the rectangle into two rectangles by a horizontal or a vertical line. Particular aspects of the invention involve the use of a slicing structure—a slicing structure may be defined as a rectangle dissection that can be obtained by recursively cutting rectangles into smaller rectangles. An example is shown in FIG. 8. Rectangle 20 is divided by a first, horizontal, cut 21 into a rectangle 5 and a remainder rectangle. The remainder rectangle is divided by a second, vertical, cut 22 into a rectangle 4 and a second remainder rectangle. The second remainder rectangle is then divided by a third, horizontal, cut 23 into a rectangle 3 and a third remainder rectangle. Finally, this third remainder rectangle is divided by a fourth, vertical, cut 24 into two rectangles 1, 2.

Figure 9:
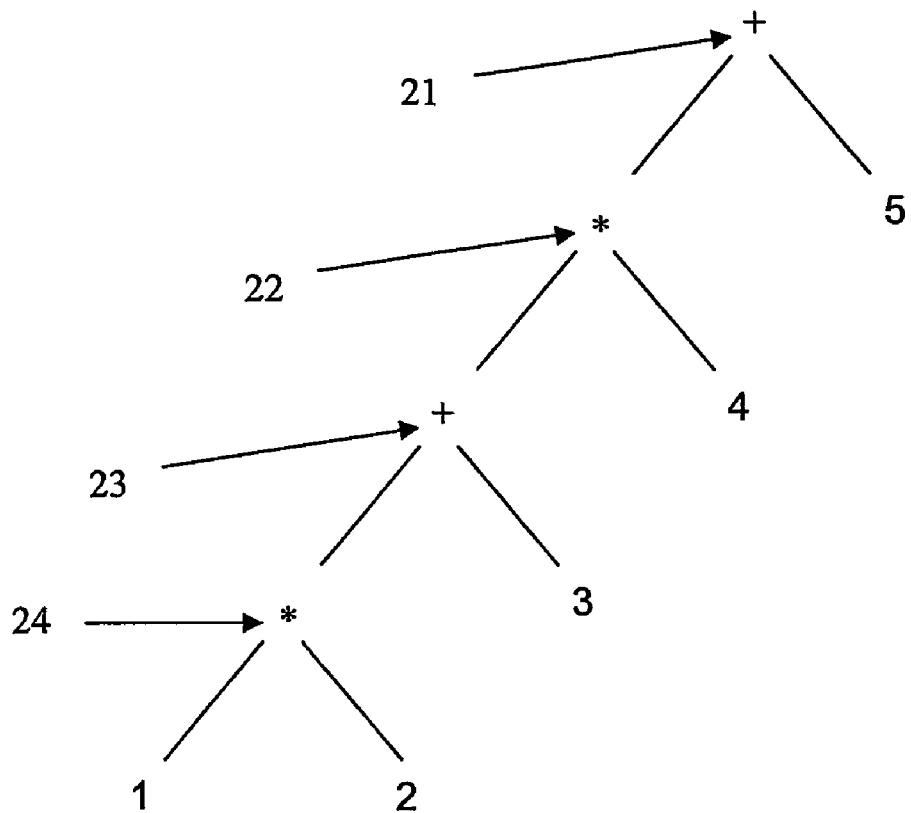
FIG. 9 shows the slicing structure of FIG. 8 represented as a slicing tree.

It will be appreciated that a slicing structure can readily be depicted as a binary tree. Such a tree, known as a slicing tree, is shown in FIG. 9. This shows a representation of the slicing structure of FIG. 8, with horizontal cuts 21 and 23 now represented by a operator +, which can now be considered to be a horizontal cut operator, and vertical cuts 22 and 24 now represented by a operator *, which can now be considered to be a vertical cut operator.

Figure 10:
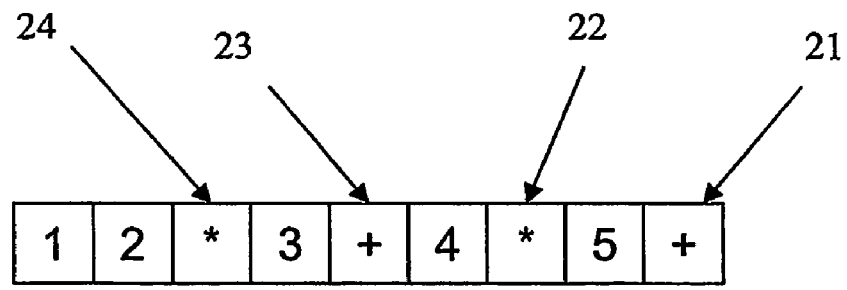
FIG. 10 shows the slicing structure of FIG. 8 represented as a Polish expression.

Wong and Liu (in D. F. Wong and C. L. Liu, "A New Algorithm for Floorplan Design", Proc. 23$^{rd}$ ACM/IEEE Design Automation Conference, Las Vegas, Nev., 1986, 101-107, the contents of which are incorporated by reference herein) developed a Polish notation for representing slicing structures (in the context of optimising VLSI floorplan layout). As indicated above, Polish notations list operands of functions before (strictly this is reverse Polish) or after their operator—this enables a sequence of operands and operators to be built up which does not require the use of brackets. FIG. 10 shows the slicing tree of FIG. 9 rendered in this Polish notation—the first "root" cut 21 is found at the end of the expression, preceded by the subtree rooted at cut 22 as the first operand and rectangle 5 as the second operand. The remainder of the expression can be seen to describe the rest of the tree according to the same principles. Wong and Liu found that a normalized Polish expression for a slicing structure (in their normalized expressions there are no consecutive operators of the same type) provided a unique representation of a slicing structure.

Cohoon et al (J. P. Cohoon, S. U. Hegde, W. N. Martin and D. Richards, "Floorplan Design Using Distributed Genetic Algorithms", IEEE International Conference on Computer Aided-Design 1988, November 1988, IEEE, New York, 452-455, the contents of which are incorporated by reference herein) discussed the use of genetic algorithms in the optimisation of VLSI floorplan layout with floorplans described as slicing structures according to Wong and Liu's approach. A genetic algorithm operates on a population of candidate expressions by producing small variations, the results of which ("offspring") are given a "fitness" score relating to their effectiveness as a solution and which affects the likelihood of their being involved in production of the next generation of candidate expressions.

In a preferred approach to optimisation, a genetic algorithm is used to find minimised values of a function. Preferred functions will be discussed further below, but the mechanics of the genetic algorithm (which can be used with a multitude of functions) will be discussed first. The different changes that can be used to create offering will now be discussed with reference to FIGS. 11 to 17.

Figure 11:
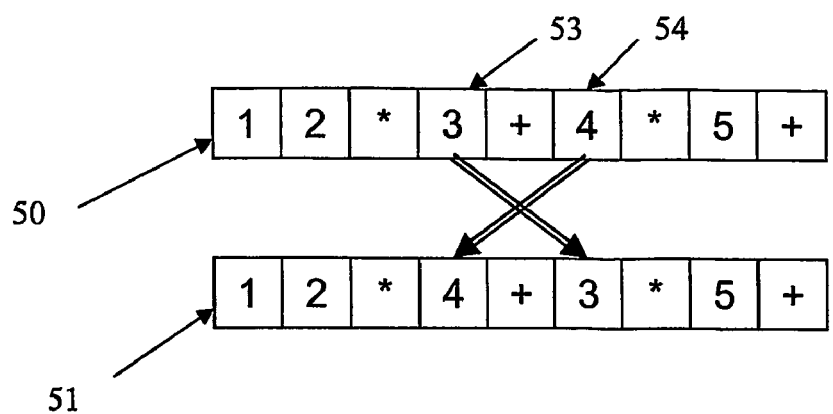
FIG. 11 illustrates a first mutation operation used in a genetic algorithm operating on the slicing structure of FIG. 8 according to approach to optimisation used in embodiments of the invention.

Change 1—This is shown in FIG. 11. It is a mutation from a single expression 50, and involves the transposition of two adjacent operands 53, 54. If the initial expression 50 is a normalized Polish expression, the mutated expression 51 will also be a normalized Polish expression.

Figure 12:
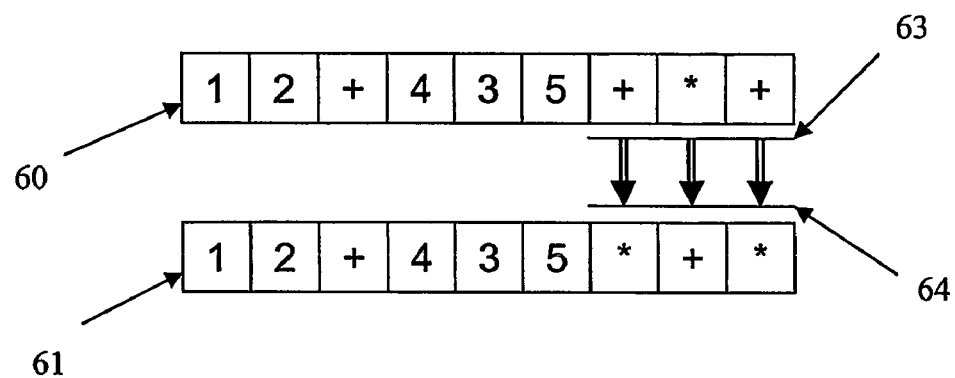
FIG. 12 illustrates a second mutation operation used in a genetic algorithm operating on the slicing structure of FIG. 8 according to approach to optimisation used in embodiments of the invention.

Change 2—This is shown in FIG. 12. This is the second mutation change from a single expression 60, and involves taking the complement 64 of a chain 63 of operators (a sequence of operators uninterrupted by operands), wherein to complement a chain involves transforming every + to a * and every * to a +. Again, if the initial expression 60 is a normalized Polish expression, the mutated expression 61 will also be a normalized Polish expression.

Figure 13:
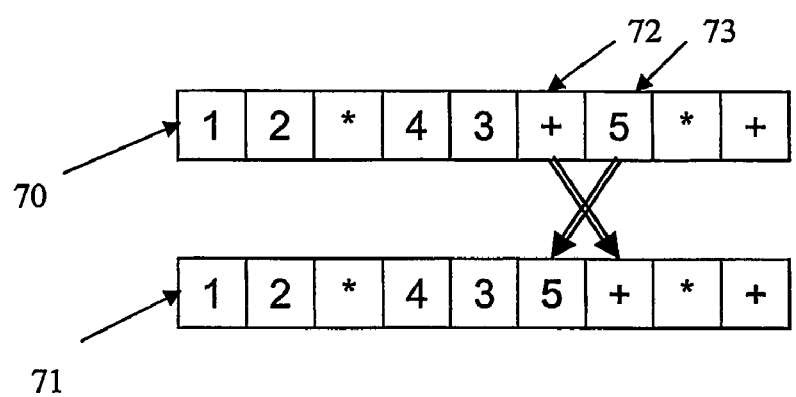
FIG. 13 illustrates a third mutation operation used in a genetic algorithm operating on the slicing structure of FIG. 8 according to approach to optimisation used in embodiments of the invention.

Change 3—This is shown in FIG. 13. This is the third mutation change, and involves transposing an adjacent operator 72 and operand 73 in the initial expression 70 to form the mutated expression 71. Unlike Change 1 and Change 2, Change 3 does not necessarily produce a normalized Polish expression—in fact, the mutated expression may not describe a possible slicing structure. The results of Change 3 will therefore need to be checked to ensure that they do describe a slicing structure.

Figure 14:
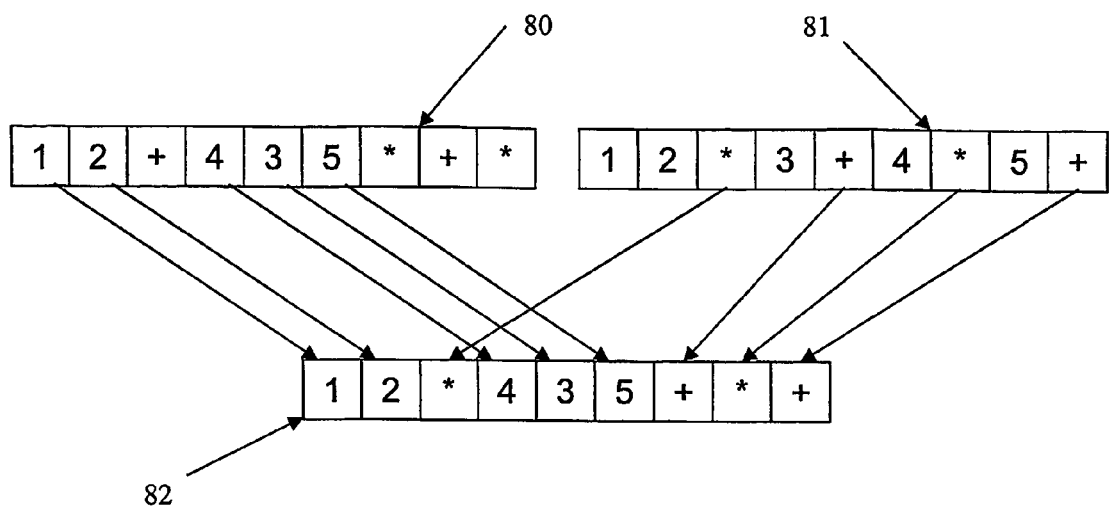
FIG. 14 illustrates a first crossover operation used in a genetic algorithm operating on the slicing structure of FIG. 8 according to approach to optimisation used in embodiments of the invention.

Change 4—This is shown in FIG. 14. This is the first crossover change from two parent expressions, and involves copying the operands from first parent 80 into identical positions in the offspring 82, and then to add operators into the gaps in the same sequence as which they occur in second parent 81. The action of the change is to propagate groups of operands from the first parent to the next generation. The result is a well-formed Polish expression (ie it does describe a slicing structure) but not necessarily a normalized Polish expression.

Figure 15:
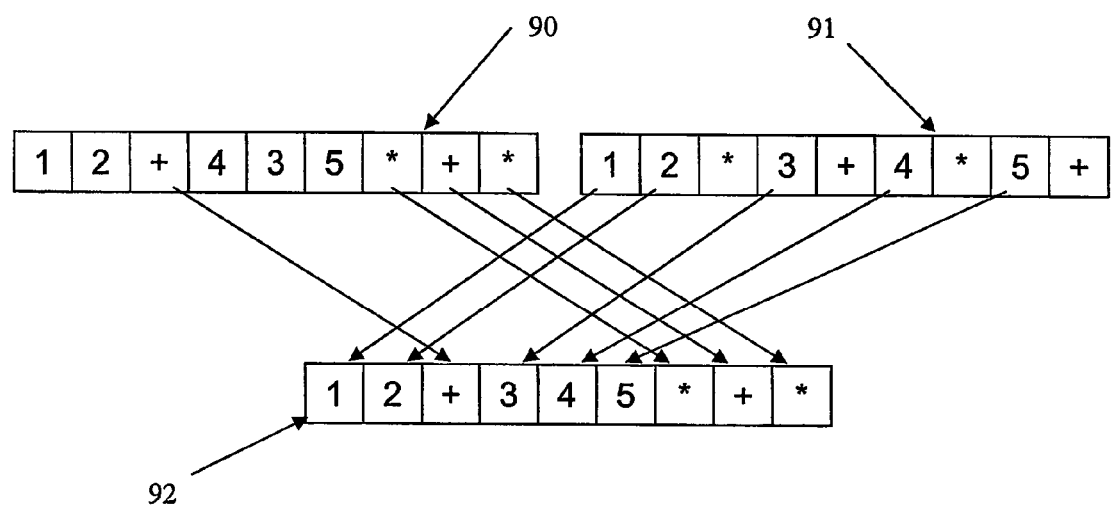
FIG. 15 illustrates a second crossover operation used in a genetic algorithm operating on the slicing structure of FIG. 8 according to approach to optimisation used in embodiments of the invention.

Change 5—This is shown in FIG. 15. This is the second crossover change from two parent expressions, and involves copying the operators from first parent 90 into identical positions in the offspring 92, and then to add operands into the gaps in the same sequence as which they occur in second parent 91. The action of the change is to propagate the slicing of the first parent to the next generation. Again, the result is a well-formed Polish expression but not necessarily a normalized Polish expression.

Figure 16:
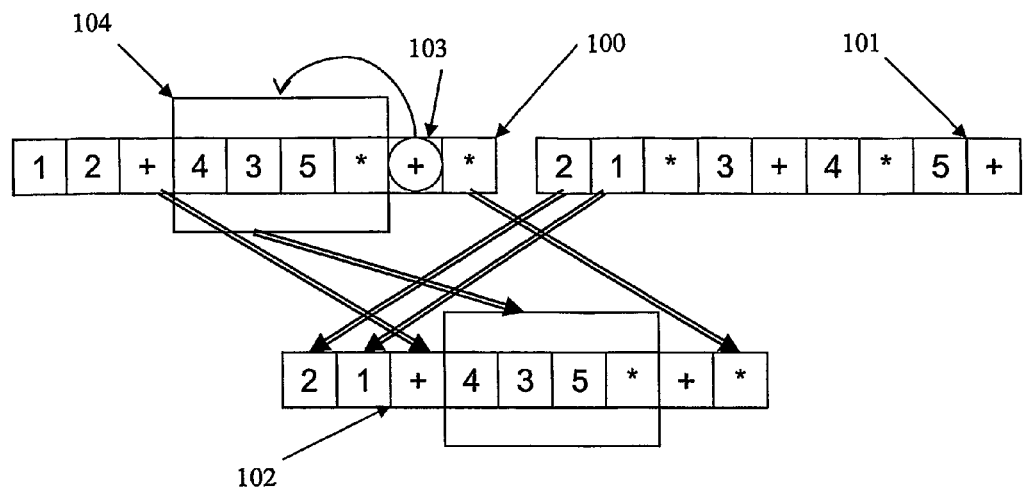
FIG. 16 illustrates a third crossover operation used in a genetic algorithm operating on the slicing structure of FIG. 8 according to approach to optimisation used in embodiments of the invention.
Figure 17:
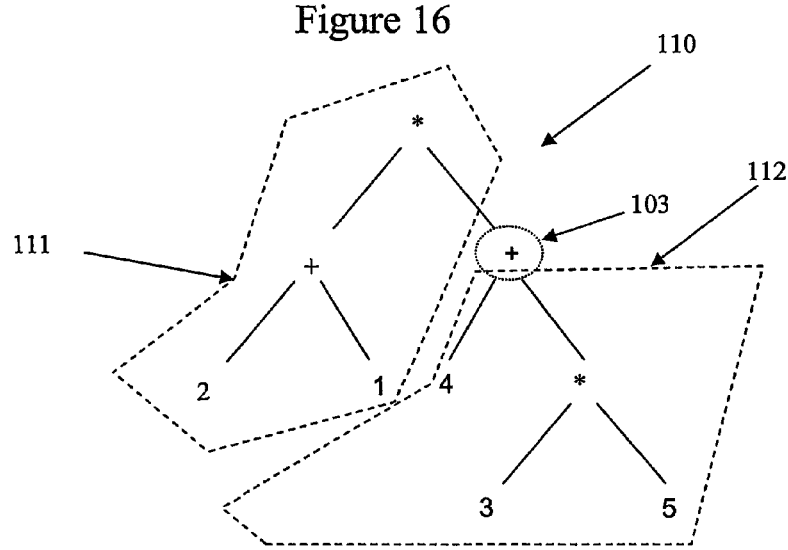
FIG. 17 shows the third crossover operation of FIG. 16 in relation to a tree structure.

Change 6—This is shown in FIG. 16. This is the third crossover change from two parent expressions, and is more complex than Changes 4 and 5. Initially, the first parent 100 is copied, and then an operator 103 is selected at random. The operands 104 of this operator 103 are preserved, but all other operands in the offspring 102 are then re-ordered using the order in which they appear in the second parent 101. This can be seen more clearly from the slicing tree 110 shown in FIG. 17. A complete subtree 112 is retained from the slicing tree 110 whereas the slicing of the other structure 111 is retained although the operands may be changed. Again, the result is a well-formed Polish expression but not necessarily a normalized Polish expression.

In attempting to solve problems of page composition, to the present inventors have appreciated that they can evaluate the suitability of arrangements by evaluation a cost function that relates to one or more properties of an arrangement of objects on a page. Such a cost function may take the form:

$$C = A + \beta B + \gamma C + \delta D \qquad \text{Equation 2}$$

where A, B, C and D are all properties of the layout (there may in principle by any number between one and infinity of such properties). It will be appreciated that a large number of properties are possible for use here—all that is necessary for a property is that a numerical value can be calculated for a particular arrangement of elements once that arrangement has been fully determined. Suitable properties may be total area, or proximity to each other of objects which are related to each other. $\beta$, $\gamma$ and $\delta$ are all weights, ensuring that the different properties are given appropriate relative importance in the cost function. The skilled person will appreciate the nature of other properties that could be employed (further examples are aspect ratio, separation of elements of similar types, measures of aesthetic quality such as placement of objects near to the golden section and so on) and will be able to generate appropriate expressions to derive numerical values. Further discussion of this point is made in our copending British Patent Application No. 0220166.3, the contents of which are incorporated by reference, further discussion of evaluation of area also being made in Wong and Liu.

A pseudocode version of an appropriate genetic algorithm for use in optimisation is as follows:

```
for G iterations do
    for nXC iterations do
        select two solutions
            crossover those solutions to create offspring
    endfor
    add all offspring to subpopulation
    calculate fitnesses
    select a population of n elements by fitness
    generate nXM random mutations
endfor
```

There are n elements in the population, a crossover rate C (with a value between 0 and 1 inclusive) and a mutation rate M (with a value between 0 and 1 inclusive). When a crossover is required, parents are chosen at random each time from the existing population, with the same parent being able to appear in subsequent crossover operations in the same generation, and the crossover operator used is chosen with equal probability from Change 4, Change 5 and Change 6. When selection is made from the generation containing parents and offspring, this selection is probabilistic but with higher probability of selecting elements with higher fitness, this probability difference being a user-variable selection pressure (selection pressure can be made variable, but would generally be kept fixed in a given context). When a mutation occurs, the mutation result replaces the original expression in the population. At the end of a generation, there are still n elements present. Clearly, the algorithm can run through an indefinite number of generations—in the present case, it is chosen to run for G generations, whereas a logical alternative is for it to run until the best solution has not improved for a predetermined number of generations, or until the cost has reduced below a pre-determined threshold. Population size, crossover rate, mutation rate, selection pressure and wirelength weight ($\lambda$) can all in principle be varied by the user.

This genetic algorithm is relatively simple and many variations and enhancements are possible—one possible enhancement is that discussed in Cohoon, of dividing the whole population into several subpopulations, running a genetic algorithm such as that indicated above separately in each subpopulation, and then allowing mixing between the different subpopulations. This process forms an "epoch", with the compound algorithm being allowed to run over a number of epochs until a termination criterion of the kind indicated above is achieved. Such an approach may increase the diversity that can be achieved and reduce the likelihood of being trapped in a local minimum when a significantly better global minimum is available. The number of subpopulations and the length of an epoch are additional user variables in this arrangement.

The key datum to preserve from running the genetic algorithm is of course the best solution discovered and its properties. For diagnostic purposes, it may also be desirable to retain the population at the start and end of a run, the genotypes of each individual in every generation in which a new best solution emerged, the number of generations until the best individual emerged and the highest fitness score in every generation.

Figure 5:
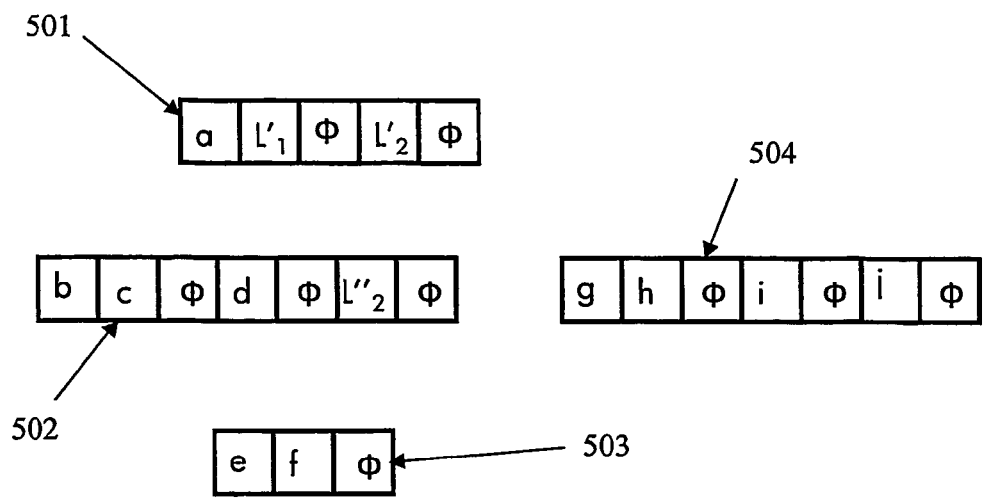
FIG. 5 shows a collection of genes derived from the tree of FIG. 5.
Figure 18:
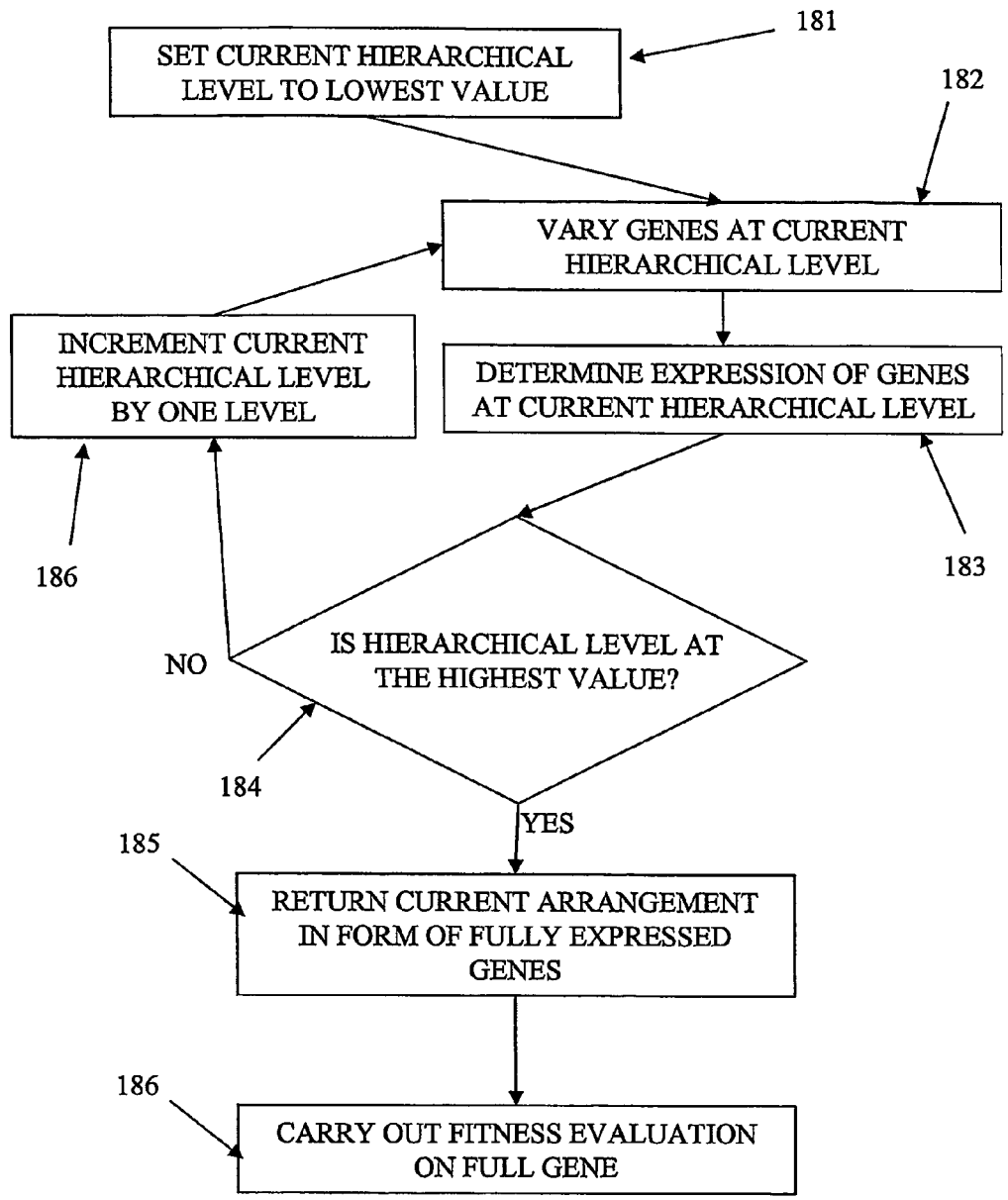
FIG. 18 illustrates an approach to optimisation by genetic algorithm of a page layout described at multiple hierarchical levels.

The approach discussed above to running of the optimisation process applies when the expression consists of a single "gene". Where there are multiple genes, as shown in FIG. 5, and as will generally be the case when there is some constraint upon the page to be laid out, some modification to this basic approach is required. A modified approach is described below with reference to FIG. 18, which represents a generation of an optimisation process (and can be carried out repeatedly until a termination condition—such as no improvement in a specified number of generations—is reached).

In this modified approach to optimisation, a first step 181 is to set a current hierarchy level as the lowest available (this will clearly only involve leaf nodes of the tree, though there may be leaf nodes that will be at higher hierarchical levels, as is the case in FIG. 5). The optimisation then enters a loop. All genes at this hierarchy level are, separately, varied in step 182—this will preferably be carrying out of a Change operator as indicated above, but may comprise a longer process involving a repeated process of carrying out Change operations and evaluating the results, such as by implementing for the gene the full pseudocode algorithm set out above (which will typically involve evaluating a cost function for that gene—this will, typically, be the same cost function as for the whole page, but may in principle be different, for example by eliminating terms that are only considered for a page as a whole). After this, or at the end of this if it is an extended process, a form (e.g. a Polish expression) for each gene is determined for that generation in step 183—this will be termed here as a fully expressed gene. The loop continues to decision step 184—if the highest hierarchical level (the root node) has not been reached, the hierarchical level is augmented by one (step 186) and the loop continues with variation of genes at the new current hierarchical level (step 182). If at the decision step 184 it is found that the highest hierarchical level has been reached, a current arrangement can be returned in the form of fully expressed genes (step 185) which can be written as a full Polish expression for the arrangement. Fitness evaluation is then carried out for this gene (step 186).

This approach—and the use of genes generally—is particularly effective if each gene forms a well-formed, closed, sequence (and this is accordingly preferred, though not essential). To be "well-formed" an expression must have at any locus, the number of preceding operands always exceeding the number of preceding operators; to be "closed" a well formed expression must contain n operands and n−1 operators. It can be shown that any well-formed closed sequence S within a Polish expression representing a slicing structure will form a rectangle containing only the operands in the sub-expression. Such a sequence is hereafter referred to as a WFC sequence. As each WFC sequence is, essentially, a rectangle, it can be noted that if each gene is a WFC sequence then each gene describes a slicing structure—some of the operands have further internal structure which is also capable of optimisation. If reorganisation within a WFC sequence has no effect on how that WFC sequence would appear within a full arrangement, then optimisation can be achieved simply by running optimisation processes independently within genes and for expressions as a whole (preferably with the same "clock"—though it could be found that different speeds of clock were helpful if it were found empirically or otherwise that better results followed from using a different mutation rate inside and outside the gene), and then calculating the cost function for genes and the whole expression separately and simply adding the result. It is likely, however, that reorganisation of a WFC sequence to form another WFC sequence will have consequences for the arrangement in which the reorganisable WFC sequence forms an element. In this case, the current form of the genes will need to be known at least before calculating the cost function of the arrangement as a whole, and preferably before the optimisation step that leads to calculation of that cost function. This is why the approach indicated in FIG. 18 (of working from the leaf nodes upwards) is preferred. It should be noted that it is in principle possible also to work from the top downwards or to work gene-by-gene in any order, but that these are likely to be less effective approaches for optimising the arrangement. Any of these approaches can be carried out such each rearrangement operation (optimisation step 182) rearranges elements at a single hierarchical level only.

The approach to optimisation described above is not limited to the vertical cut operator * and the horizontal cut operator +. There are at least two further classes of operators—a first class which can be realised, in the context of slicing structures, by use of * and + operators and some limitation on the reorganisation possible within a gene, and a second class which are not reducible to * and + operators and have different transformation properties. These two classes will be further discussed below, though it should be appreciated that other classes are in principle possible.

The first class of operators include "Top", "Bottom", "Left" and "Right" operators, which constrain one operand to lie at one of the four sides of the rectangle described by the gene. These can clearly be rendered by forcing the gene to adopt, respectively, the following forms:

A:Top—XA+
A:Bottom—AX+
A:Left—AX*
A:Right—XA* where X is a WFC sequence. Consequently, either the last two, or the first and last, elements in the gene are fixed. Constraining elements to cover the top right or bottom left of the containing rectangle is even simpler—all that is necessary is for the operand concerned to be constrained to be the last or first operand in the gene respectively.

A further first class operator allows for three WFC sequences to be arrayed vertically (useful for title, heading, content block pages). This uses the property that an WFC Sequence S as defined in rule 2 occupies the entire width of the page if S is immediately preceded by a WFC $S_0$ whose start is at the beginning of the Polish expression describing the slicing structure, and S is immediately followed by the sequence of either (a) +WFC $S_1$+ or (b) WFC $S_1$++. In either (a) or (b), the last + must be the end of the Polish expression. In the special case that $S_0$ or $S_1$ is of zero length, the leftmost + in (a) or (b) is removed. This can be achieved by requiring that three WFC sequences remain in the relationship shown by the rule.

Some elements that would not appear to lie in the first class can in fact lie there if further factors can be taken into account in "expressing" the gene. Such an operator is "Crop_Decision"—for a gene with multiple units, this could operate as unconstrained grouping but with an identified unit for "cropping". When the gene is expressed, rather than requiring the rectangle for this unit to take certain minimum dimensions, the size of the rectangle can be reduced (potentially with a sliding cost to this reduction, or a cost applying for reduction below a certain threshold).

The nature of operators in the second class is typically somewhat different. One operator of this type is shown in the FIG. 3 hierarchy—this is "Overlap". For this operator, the overlapping element is located over the top of the overlapped element. It is easy to set this gene, once evaluated, as a rectangle of known size—if complete overlap is specified, the gene can simply be set to be a rectangle appropriate to bound the overlapped element (assuming that, as here, the overlapped element is to be larger than the overlapping element—it is difficult to see a use for the other case). Transformation of the gene can only be accomplished by changing the position of overlap—consequently the nature of transformation will be different, and will involve setting an overlap point (and, possibly, overlap orientation) and optimising by moving this overlap point (and orientation) according to genetic algorithm techniques (or any other stochastic process). For this to be usefully accomplished there must be an associated cost function that distinguishes usefully between different overlaps. It is likely that this will be determined by aesthetic factors—proximity of centres of mass of the elements would be favoured, but occlusion of potentially significant detail on the overlapped item would be strongly disfavored. A further such operator would be "Crop-Amount"—this would operate on a single element, and would determine if the element were to be cropped, where the cropping would occur—this could be optimised against aesthetic factors as before with the movable items being the crop boundaries (this could also be used to optimise the cost function used for "Crop_Decision" above).

One modification to this approach is to allow for repetition of substructures. Referring back to FIG. 2, it may in some circumstances be desirable (for example, for clarity or visual appeal) for elements of the same type to have the same form. This is most readily applicable to non-primitive elements with a set of component elements primitive or non-primitive) that are similar. Such non-primitive elements would generally be at the same hierarchical level (though this is not essential). In FIG. 2, groups 203 and 201 are examples of such non-primitive elements—as can be seen from FIGS. 2 and 3, these groups are at the same hierarchical level and each has elements (in the case of group 203, these are picture 210$j$, price text 210$h$, subheading 210$g$ and descriptive text 210$i$) which correspond one-to-one with elements in the other group.

Figure 19:
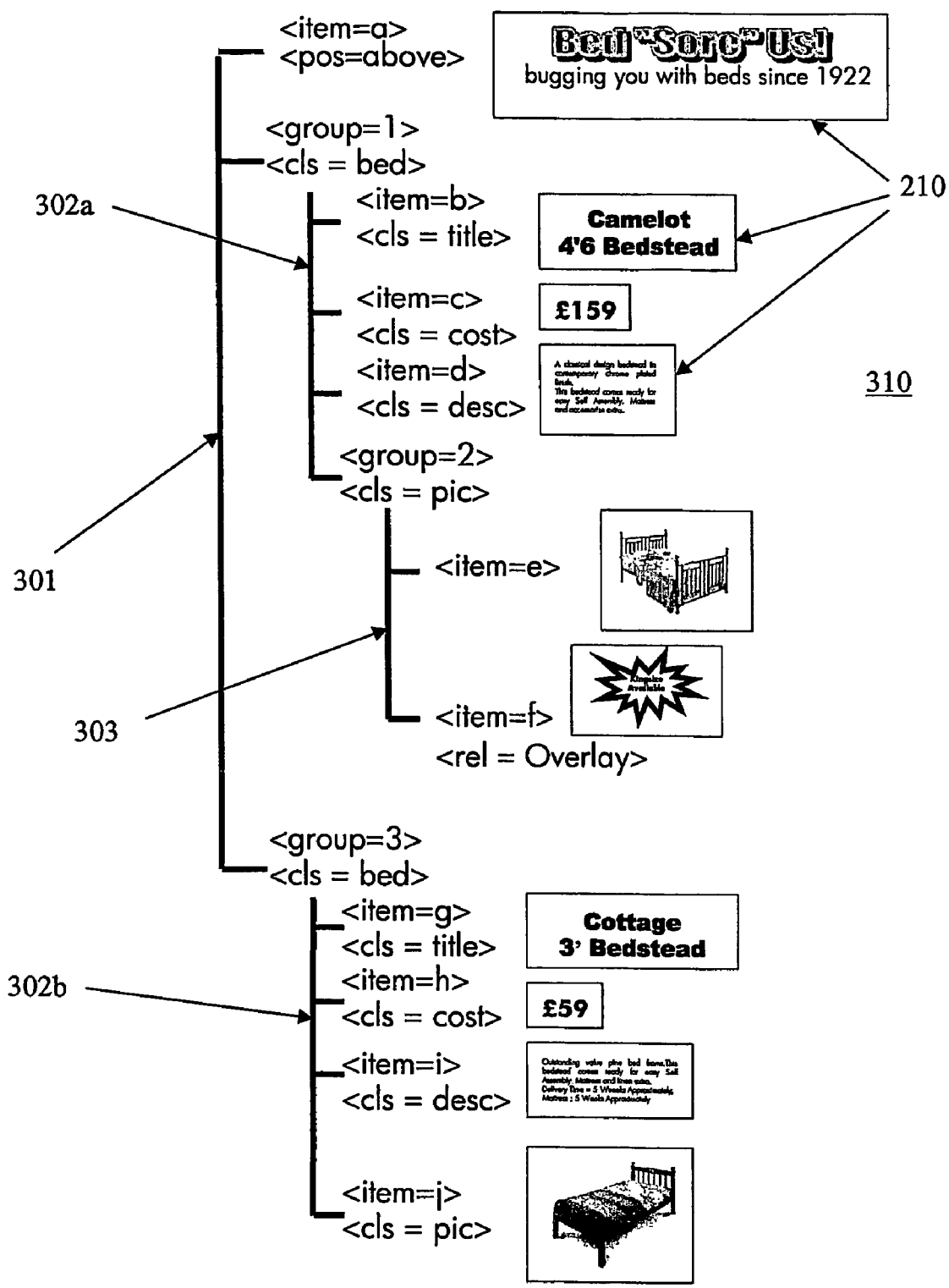
FIG. 19 shows a modified form of the hierarchical representation of FIG. 3 in accordance with a further embodiment of the invention.

This repetition constraint may be considered as requiring groups of the same class to have the same topology. This requires a mechanism (such as user labelling) to determine which elements are to be placed in which class. FIG. 19 shows an example of how this can be achieved using XML-type attributes—reference numbers are as for FIG. 3, of which FIG. 19 is a modification. In practice, a database field name is likely to be available for appropriate element labelling. The repetition constraint can be applied in the specific case of FIGS. 2 and 19 to ensure that groups 201 and 203 have the same topology—that is, that the topology of the elements shown by middle level connecting line 302$a$ should be the same as for the corresponding elements shown by middle level connecting line 302$b$.

This constraint can be achieved readily in embodiments of the invention where separate genes are used for different subtrees in the document's hierarchy. In construction of the genetic expression for the whole page (which can be termed the phenotype), it is now necessary to define one "master" gene to specify the relative position of all elements on the next hierarchical level for all groups of the same class, or all designated groups of the same class. In the FIG. 5 case, this would mean that gene 502 could be used to describe both groups 201 and 203, and gene 504 would become redundant.

Using this approach, group 2 of FIG. 19 has the same class as the picture in group 3, so both these elements would occupy the same relative position within their group, this relative position being determined by the master gene. The ability to modify the primitives within group 2 would be unaffected. Evaluation of the optimisation step would generally require full expression of all the genes for the page—the evaluation function may well provide different results for different groups.

This approach need not be limited to cases in which each group represented by a master gene has every element of that master gene). The gene (of the choices available) with all necessary operands can be used as the master gene, and for genes missing one or more elements, a print object of zero area can be used to represent that element in the gene.

Figure 20:
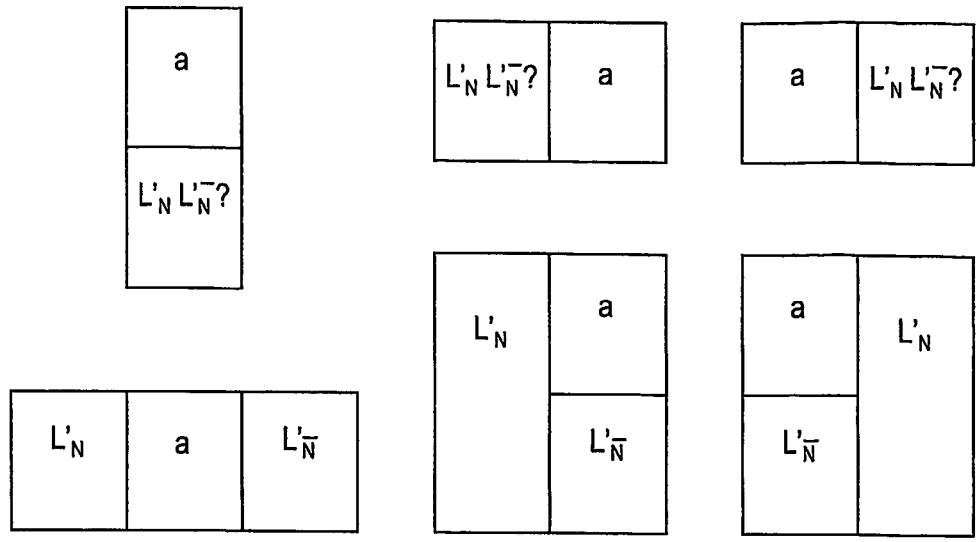
FIG. 20 shows alternative topologies that satisfy the inclusive constraint that a primitive lies at the top of a layout.

The natural symmetry (both rotation and reflection) of rectangle dissection can be exploited to provide corresponding reflection or rotation in the repeated groups. This is a technique employed by skilled layout artists to provide variation, while retaining coherence. The desired translation could be specified explicitly as an attribute in the document hierarchy of FIG. 19. Alternatively it could be placed under genetic control, or both. A further modification to the embodiments set out above allows for inclusive as well as exclusive constraints. An exclusive constraint is one which can only be satisfied by one relevant object—for example, "<pos=above>" in respect of group 202 as shown in FIGS. 2 and 3. Only one relevant object can lie at the top of the page with this constraint. An inclusive version of this constraint would be one that would allow one or more of the elements to lie at the top of the page in parallel, but would require that the object affected by the constraint must be one of those one or more elements. An example is shown in FIG. 20. Unlike exclusive constraints, which can typically be satisfied in a single topology, inclusive constraints are typically satisfiable by a number of topologies. FIG. 20 represents the inclusive constraint that primitive a lies at the top of the layout. This requires six topologies, with N and N bar used to denote that $L'_1$ and $L'_2$ are interchangeable. Where multiple topologies satisfy a constraint, a single fixed gene is no longer sufficient to encode the constraint, so a more complex approach needs to be employed.

Examples of such inclusive constraints include not only "top" but in similar fashion "bottom", "left" and "right". These constraints can clearly be used effectively for organisation at a highest hierarchical level of a page, but may also apply to lower hierarchical levels (so that a given element could be constrained to be somewhere at the "top" of a block, the block itself being locatable anywhere within the page as a whole). For the purposes of this discussion, a hierarchical level will be termed a "tier".

Figure 21:
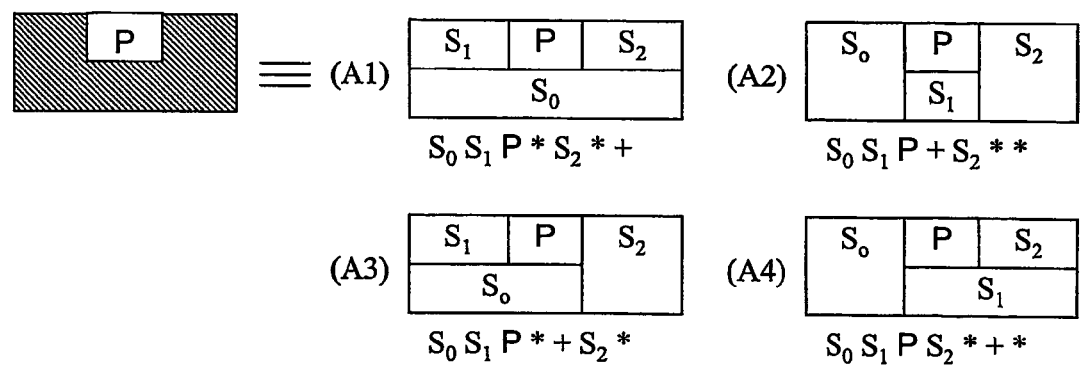
FIG. 21 shows four combinations of well formed closed sequences that satisfy the inclusive constraint that primitive P lies at the top of a layout.
Figure 22:
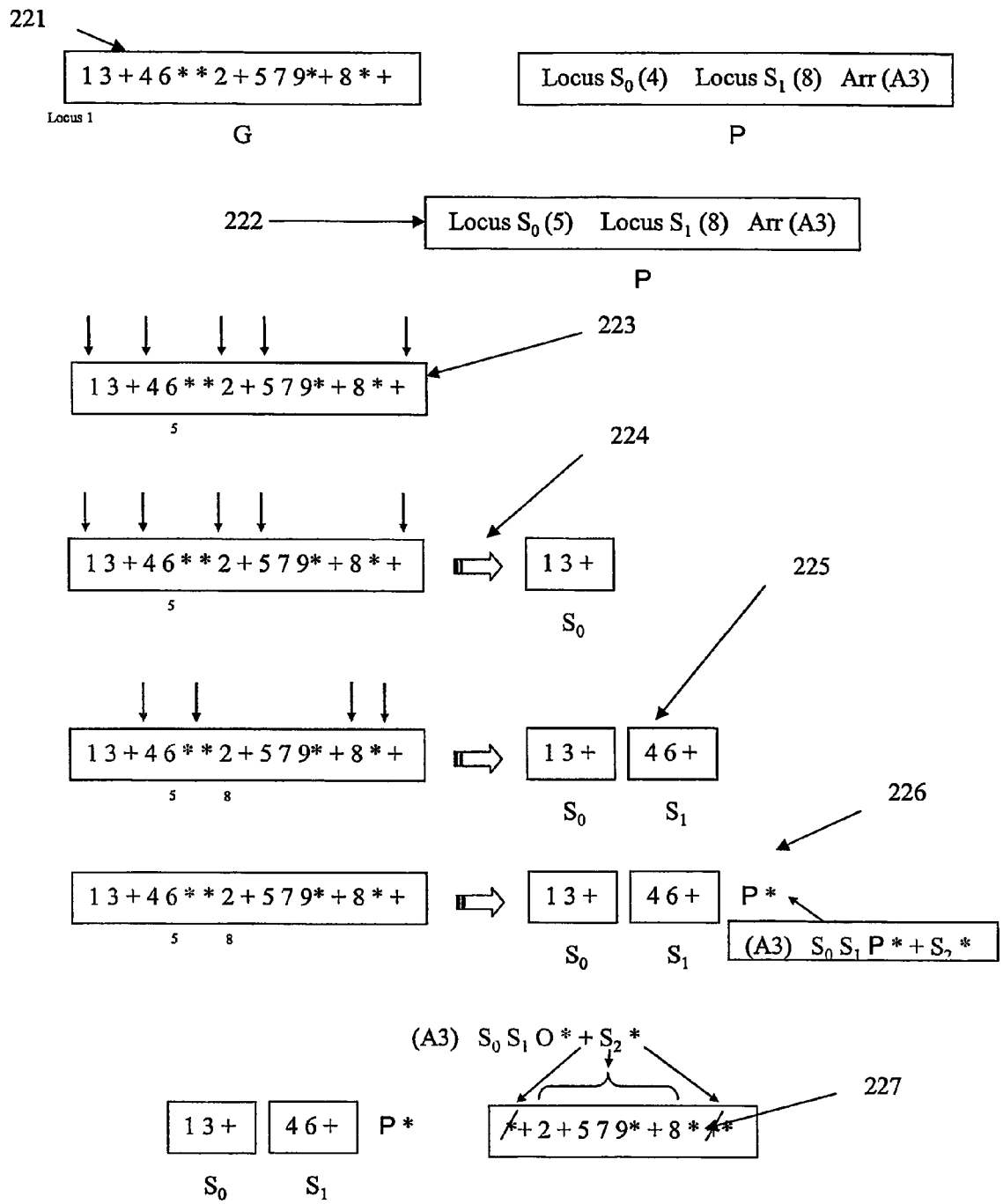
FIG. 22 shows a method for incorporating the inclusive constraint shown in FIG. 21 into a gene representing a slicing structure such that the layout is optimised according to embodiments of the invention.

An example of how inclusive constraints can be incorporated into embodiments of the invention is shown with respect to FIGS. 21 and 22. Use of the "top" constraint is shown, but the approach described is equally applicable to the other inclusive constraints described above.

FIG. 21 depicts an object P, which may be a single primitive element or a group, that is constrained to lie at the top of its tier but such that it may share the top of its tier with other objects whose placement is not yet determined. The properties of slicing structures, as previously described, provide that this arrangement can be partitioned into a series of WFC sequences P, $S_0$, $S_1$, and $S_2$. It should be noted that any of $S_0$, $S_1$, and $S_2$ may be a null sequence (though clearly all three cannot be null if there are objects in the tier apart from P alone) in which case P will lie in a corner of the tier or at both top and bottom. The four ways in which this can be carried out are shown in FIG. 21. If the slicing structure describing all of the objects in the tier is of the form of one of the four sequences describing the arrangement, then the constraint is bound to be satisfied.

A method for implementing the "top" constraint in this context (but with general application to such constraints) is shown in FIG. 22. In step 221, a single gene G is encoded which is a WFC sequence containing all the tier's objects except P. P is defined in terms of loci for the end of $S_0$ and $S_1$ chosen in the previous genetic manipulation together with a given one of the four possible arrangements—this is sufficient to define an arrangement of P, $S_0$, $S_1$, and $S_2$. The value of the $S_0$ locus is constrained to be less than or equal to the value of the $S_1$ locus, but either can take on any possible locus within the overall gene G. In step 222, the expression for P is varied. This can be best done by randomly incrementing or decrementing one or both of the locus values—in this case, the variation made is to increment the value for locus $S_0$. After this, loci in the gene demarcating WFC sequences (by their end point) are found. In step 223, any locus in the gene G which demarcates a WFC sequence is calculated. In step 224, the WFC corresponding most closely in locus to the locus for $S_0$ in the new expression for P is selected (an arbitrary rule—lower or higher locus—can be adopted in the case of a locus in the expression for P being equally close to two WFCs in the expression for G). In step 225, it is necessary to recalculate the WFC sequences in the remainder of the gene and then step 224 is repeated for $S_1$. In the following step 226, P is inserted into the gene together with an appropriate operator. The rest of the gene (defining $S_2$) then needs to be inserted (in step 227) to produce a full expression in accordance with the chosen arrangement—this may require modification of the first and last operators. Fitness evaluation can be carried out at on the fully assembled gene (or if this is a subgene, when the gene is fully constructed). This process can be carried out in appropriate sequence for all such inclusive constraints in the gene (or in the case of a gene with subgenes, in all subgenes within the gene) before other steps in reconstruction of the full gene and its fitness assessment.

As is shown in the P indicated in step 221, it is necessary to store the locus at which P is inserted together with which of the four arrangements is chosen somewhere in association with the genotype so that the next generation can be produced appropriately and modifications inherited. An alternative to storing an arrangement in P used for generating the next generation is simply to test each of the four arrangements at evaluation time and the best chosen, in which case it is only necessary to store the locus.

It has been described here how, in aspects of the invention, a page layout can be built up by constructing a hierarchical description of the elements, or print primitives, that are to be used on a document page (clearly, this process can be carried out for every page of a document). This page layout can then be optimised very effectively, as the hierarchical description can be used to preserve constraints while allowing for effective optimisation using, for example, efficient stochastic processes discretely at different levels of the hierarchy. It has also been described how optimisation using a genetic algorithm as such a stochastic process can be implemented for such a hierarchical description to produce an optimised page layout.

The invention claimed is:

1. A method of laying out a page which is to contain a plurality of discrete document elements, comprising:

receiving a hierarchical page description describing layout of the discrete document elements on the page, wherein the hierarchical page description contains two or more hierarchical levels and, for each hierarchical level, the page description contains a description of discrete documents from the plurality of discrete document elements in the hierarchical level and at least one constraint for arranging the discrete documents in the hierarchical level, and for a particular hierarchical level of the two or more hierarchical levels, the at least one constraint for that particular hierarchical level is only applicable for that particular hierarchical level;

for each hierarchical level, optimizing layout of the page described by the hierarchical page description, one hierarchal level at a time, by rearranging the plurality of discrete elements in a single hierarchical level at a same time using the at least one constraint for the hierarchical level, to minimize the value of a cost function; and laying out the discrete document elements on the page for each hierarchal level, one hierarchal level at a time, according to the optimized hierarchical page description layout for each hierarchal level.

2. A method as claimed in claim 1, wherein a discrete document element may consist either of a representation of a group of document elements associated together at a lower hierarchical level or of a primitive document element.

3. A method as claimed in claim 2, wherein the hierarchical page description is representable as a tree with a primitive document element at each leaf node and with a representation of a group of document elements at each branching node.

4. A method as claimed in claim 1, wherein said optimizing comprises carrying-out, at a hierarchical level, rearrangement operations only on document elements forming part of a group represented as a document element at the next higher hierarchical level.

5. A method as claimed in claim 1, wherein optimizing the hierarchical page description layout comprises repeated use of a stochastic process.

6. A method as claimed in claim 5, wherein the hierarchical page description is describable as one or more genes each comprising a series of document elements and operators, and the stochastic process comprises use of a genetic algorithm.

7. A method as claimed in claim 6, wherein the hierarchical page description comprises one or more repeated genes.

8. A method as claimed in claim 7, wherein one or more classes are determined for document elements, a repeated gene is describable in terms of an ordering of element classes, and each expression of a repeated gene is describable in terms of document elements or groups of document elements corresponding to some or all of the element classes in the repeated gene.

9. A method as claimed in claim 1, wherein the hierarchical page description describes a slicing structure.

10. A method as claimed in claim 1, wherein one or more of the rearrangement operations comprises separating a constrained element from one or more unconstrained elements, rearranging the unconstrained elements without rearranging the separated constrained element, and then recombining the rearranged unconstrained elements with the constrained element that has not been rearranged.

11. A computer comprising a processor programmed to perform the method of claim 1.

12. A computer-readable storage medium comprising code adapted to program when executed, a processor of a computer system, to perform the method of claim 1.

13. The method as defined in claim 1, wherein said optimizing is performed, at a single hierarchical level at a time, from the lowest hierarchical level to the highest hierarchical level.

14. A computer-readable storage medium having one or more instructions, which when executed by a processor, to perform operations of laying out a page which is to contain a plurality of discrete document elements comprising:

two or more hierarchical levels;

wherein each document element is placed at one of the hierarchical levels, and for each hierarchical level, the page description contains a description of discrete documents from the plurality of discrete document elements in the hierarchical level and at least one constraint for arranging the discrete documents in the hierarchical level;

for a particular hierarchical level of the hierarchical levels, the constraint for that particular hierarchical level is only applicable for that particular hierarchical level; said description further comprising, in association with at least one of the document elements, a further constraint individually placed on said at least one document element and specifying how said at least one document element should be laid out on the page; and the hierarchical levels in the description are representable as a tree with a primitive document element at each leaf node and with a representation of a group of document elements in one of the hierarchical levels at each branching node, and wherein each branching node represents a constraint placed on the elements of the group that is represented at that branching node, and for each hierarchical level, optimizing layout of the page described by the hierarchical page description, one hierarchal level at a time, by rearranging the plurality of discrete elements in a single hierarchical level at a same time using the at least one constraint for the hierarchical level, to minimize the value of a cost function; and laying out the discrete document elements on the page for each hierarchal level, one hierarchal level at a time, according to the optimized hierarchical page description layout for each hierarchal level.

15. A computer-readable storage medium as claimed in claim 14, wherein each representation of a group of document elements is describable as a gene comprising one or more operators and one or more operands.

16. A computer-readable storage medium as claimed in claim 15, wherein the hierarchical page description comprises one or more repeated genes.

17. A computer-readable storage medium as claimed in claim 16, wherein one or more classes are determined for document elements, a repeated gene is describable in terms of an ordering of element classes, and each expression of a repeated gene is describable in terms of document elements or groups of document elements corresponding to some or all of the element classes in the repeated gene.

18. A computer-readable storage medium as claimed in claim 14, wherein the description of document elements represents a slicing structure.

19. A method of generating a description of document elements to be laid out on a page, comprising:

identifying primitive document elements to be laid out on the page;

identifying constraints on the layout of the primitive document elements on the page;

constructing a hierarchical page description with a plurality of hierarchical levels, each primitive document element being placed at one of the hierarchical levels, and each document element at a lower hierarchical level being linked by one of the constraints to a document element at a next higher hierarchical level;

storing, in said description and in association with at least one of the document elements, a further constraint individually placed on said at least one document element and specifying how said at least one document element should be laid out on the page; and for each hierarchical level, optimizing layout of the page described by the hierarchical page description, one hierarchal level at a time, by rearranging the plurality of discrete elements in a single hierarchical level at a same time using the at least one constraint for the hierarchical level, to minimize the value of a cost function; and laying out the discrete document elements on the page for each hierarchal level, one hierarchal level at a time, according to the optimized hierarchical page description layout for each hierarchal level.

20. The method as defined in claim 19, wherein said further constraint specifies whether said at least one document element should occupy a particular position on the page, or overlap another document element.

21. The method of claim 19, wherein the further constraint is only applicable for the at least one document element in the hierarchical level that the at least one document element is placed.

* * * * *